Jan. 12, 1971 H. R. NEWELL 3,554,058
STEP MOTOR WITH PURE FLUID ACTUATION
Filed May 8, 1969 3 Sheets-Sheet 1
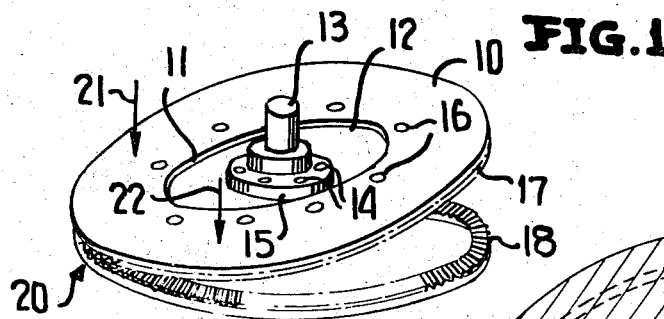
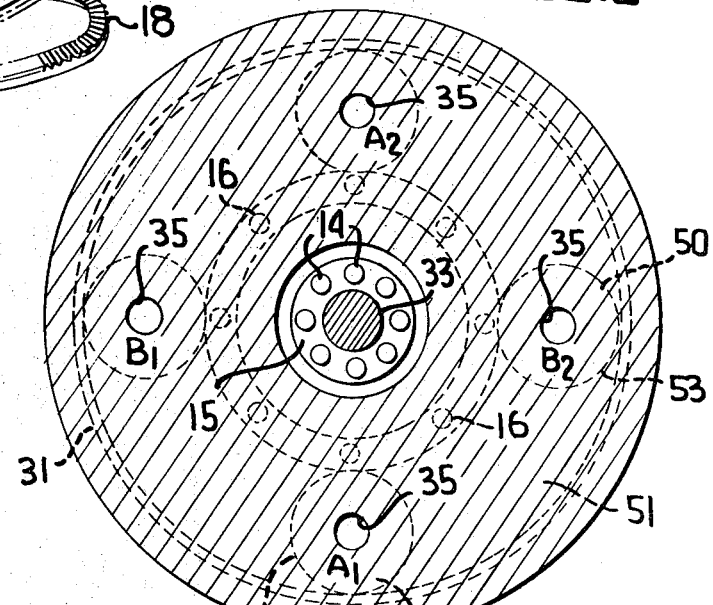
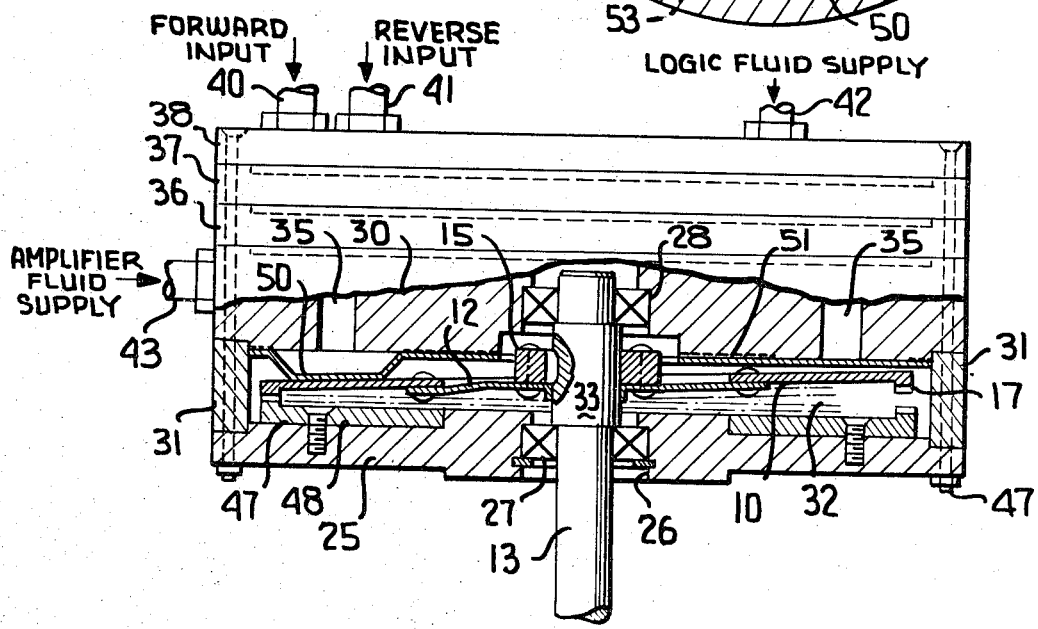
INVENTOR
HAROLD R. NEWELL
BY Hurvitz, Rose & Greene
ATTORNEYS Jan. 12, 1971   H. R. NEWELL   3,554,058
STEP MOTOR WITH PURE FLUID ACTUATION
Filed May 8, 1969   3 Sheets-Sheet 2

INVENTOR
HAROLD R. NEWELL

BY Hurvitz, Rose & Greene
ATTORNEYS

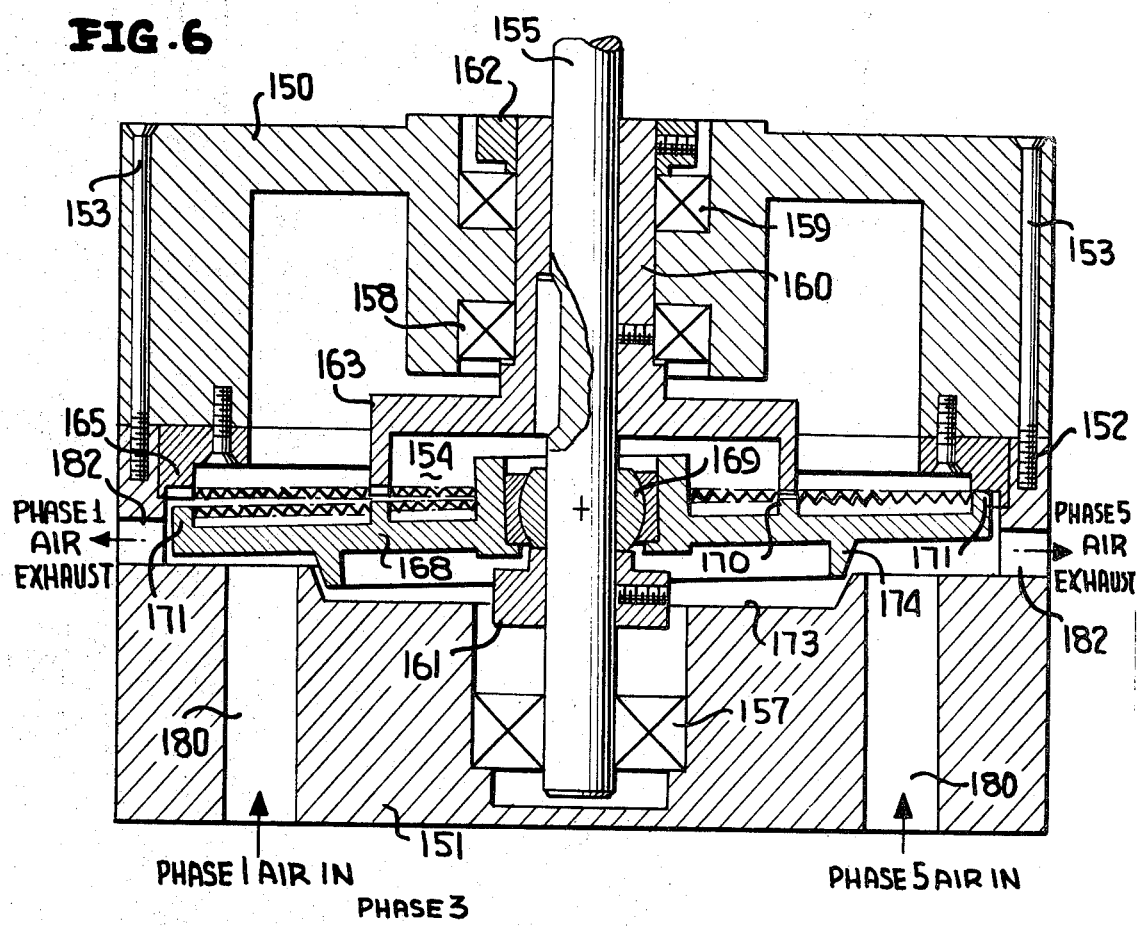
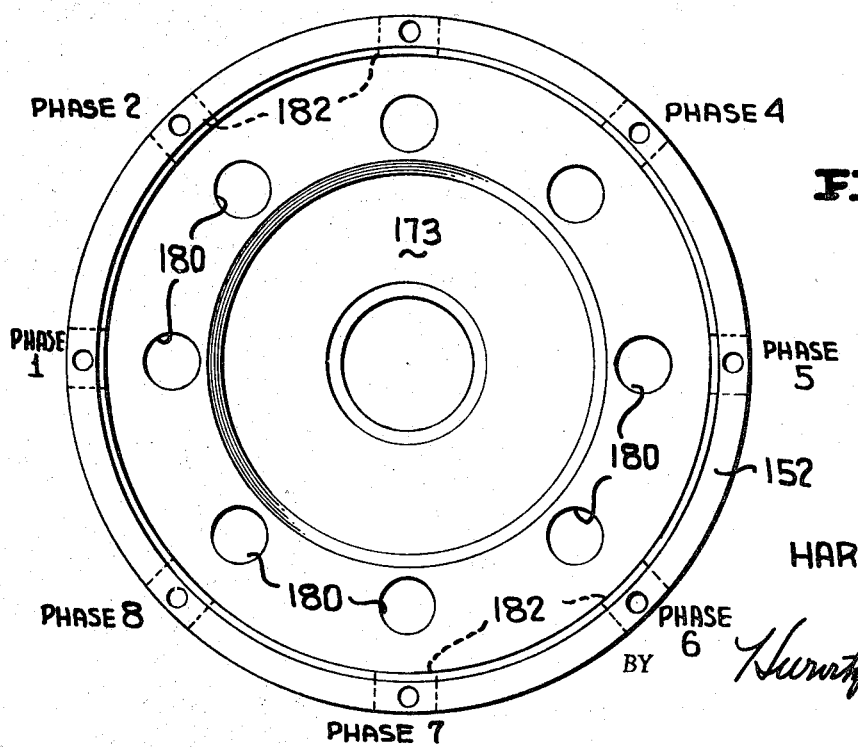

3,554,058
STEP MOTOR WITH PURE FLUID ACTUATION
Harold R. Newell, South Newbury, N.H., assignor to Mesur-Matic Electronics Corporation, Warner, N.H., a corporation of Delaware
Filed May 8, 1969, Ser. No. 822,919
Int. Cl. F15b *13/02;* F15c *1/12;* F16h *1/28*
U.S. Cl. 74—800                                                    14 Claims

ABSTRACT OF THE DISCLOSURE

A step motor includes a motor housing defining a chamber into which a rotable shaft extends. A rotor disk is pivotally coupled to the shaft and supports a circular gear having a common axis with the shaft when the plane of the disk is perpendicular to the shaft. Otherwise the gear axis and shaft axis intersect at a slight skew angle when the rotor disk is tilted relative to the shaft axis. A cooperating circular gear having an axis in common with the shaft is longitudinally displaced from the rotor gear by a distance sufficient to prevent meshing of the confronting teeth of the two gears when they lie in parallel planes, but to permit meshing in a limited sector when the rotor is deflected through a sufficient tilt angle relative to the shaft axis. One of the gears is fastened to the shaft to produce rotation upon continued meshing of the teeth of the two gears through a circularly moving sector, the shaft thereby rotating at a speed depending on the tooth differential between the two gears. A fluid logic driver delivers fluid actuating pulses in a predetermined format to a circular array of ducts oriented substantially perpendicular to the rotor and conforming in number and location to the desired motor phases, to produce sequential deflection of the rotor in a wobbling motion about the shaft axis.

BACKGROUND OF THE INVENTION

The present invention relates generally to the field of step motors, in which the shaft of a synchronous multiphase motor is rotated in small angular increments to digitally drive a load device. Specifically, the invention resides in a step motor structure cooperating with a pure fluid logic driver system.

Step motors of the general type with which the present invention is concerned comprise a rotatable shaft, a rotor disk carrying one or more circular gears arranged to mesh in a small sector with the same number of confronting gears as the rotor disk pivots in wobbling movement about the shaft in response to forces exerted on the disk by an appropriate actuator as controlled by a driver circuit. Such a step motor is disclosed in my copending U.S. patent application entitled "Harmonic Drive for Digital Step Motor," Ser. No. 627,410, filed Mar. 31, 1967, and a suitable driver circuit for electromagnetic actuation of the motor is disclosed in my copending application entitled "Multi-Phase Step Motor Control Circuits," Ser. No. 581,334, filed Sept. 22, 1966, now U.S. Pat. No. 3,444,447 both of these assigned to the same assignee as the present application.

In the prior art electromagnetically actuated motor, the several field windings corresponding to the phases of the motor are energized in sequence, according to a preselected switching format, by a driver circuit that delivers power pulses to the windings. In an eight phase motor, for example, the windings might be excited two at a time, in adjacent pairs according to the format A+B, B+C, C+D, D+E, . . . , G+H, H+A, A+B, and so forth, where windings A through H correspond to phases 1 through 8, respectively. The windings are equally spaced in a circular array on a stator core and the rotor disk is composed of magnetically permeable material, so that the magnetic field generated upon excitation of the windings in sequence forces the disk to wobble about the shaft and the gears to mesh with one another. This in turn produces discrete angular motion of the shaft, which is coupled either to a gear with which one of the rotor gears meshes, or to the rotor itself. In any event, the gears are provided with different numbers of teeth to produce relative rotation therebetween, and hence, the incremental rotation of the shaft.

It is an object of the present invention to provide a wobble disk step motor structure capable of being actuated in the aforementioned manner to produce digital stepping of the shaft, in response to pneumatic or hydraulic actuation controlled by a pure fluid logic driver system.

SUMMARY OF THE INVENTION

According to a preferred embodiment of the present invention, the rotor disk is flexibly coupled to the shaft to permit tilting, and thus wobbling, relative to the shaft and to cause the shaft to rotate with the disk. A single pair of cooperating ring gears is provided, one fastened to the rotor and the other fastened to the motor housing, the two gears having a slight difference (e.g., one tooth) in number of teeth so that wobbling of the rotor about the shaft is accompanied by meshing of the gears in a single sector, and relative rotation of the gears (and of the shaft relative to the motor housing). Equally spaced passageways for carrying fluid correspond to the motor phases, and actuators, and are circularly arrayed about the motor structure with an orientation generally perpendicular to the rotor itself.

Fluid pulses are supplied to these passageways in a phase energization sequence according to the preselected switching format defined by the operation of a pure fluid logic system. The logic system is conveniently mounted in overlying laminae containing the fluidic elements of the system, to the remainder of the motor housing. Orifices are provided in the various laminae to permit introduction of input pulses and constant supply fluid pressure to the appropriate elements of the logic or driver system. In a preferred embodiment of the logical driver, a plurality of two input port-one output port AND gates equal in number to the number of motor phases each have one input port fed in parallel with the corresponding input port of the other gates by pneumatic pulses supplied from a pulse oscillator. The output port of each gate is coupled to a respective control input port of a respective flip-flop associated with each pair of gates. The phase actuation sequence or switching format is selected by appropriate feedback from the power stream output ports of the flip-flops to respective ones of the other input port (i.e., not supplied by the input pulses) of each AND gate. The power stream output ports are also coupled to respective control stream input ports of cascaded flip-flop stages employed to provide amplification of power stream pulses directed in the proper phase sequence against the rotor disk. This produces the wobbling of the disk about the shaft and the consequent stepped rotation of the shaft.

In a second embodiment of the motor, the rotor disk carries a pair of coaxial ring gears one of which meshes in a sector with a confronting ring gear fastened to the motor housing, and the other of which meshes in the same sector with a confronting ring gear fastened to the shaft. The rotor is pivotally coupled to the shaft in such a manner as to permit relative rotation between rotor and shaft and at least slight axial motion of the disk along the shaft.

BRIEF DESCRIPTION OF THE DRAWINGS

FIG. 1 is a simplified perspectve view of the basic motor elements in the preferred embodiment, for the sake of clarity in explaining the motor operation;

FIG. 2 is a section view taken in a plane normal to the axis of the shaft, of the preferred motor structure;

FIG. 3 is a partial section view taken in a plane containing the shaft axis, of the motor structure of FIG. 2;

FIGS. 6 and 7 are an axial section view and a bottom view, respectively, of another embodiment of the motor.

DESCRIPTION OF THE PREFERRED EMBODIMENTS

Figure 4:
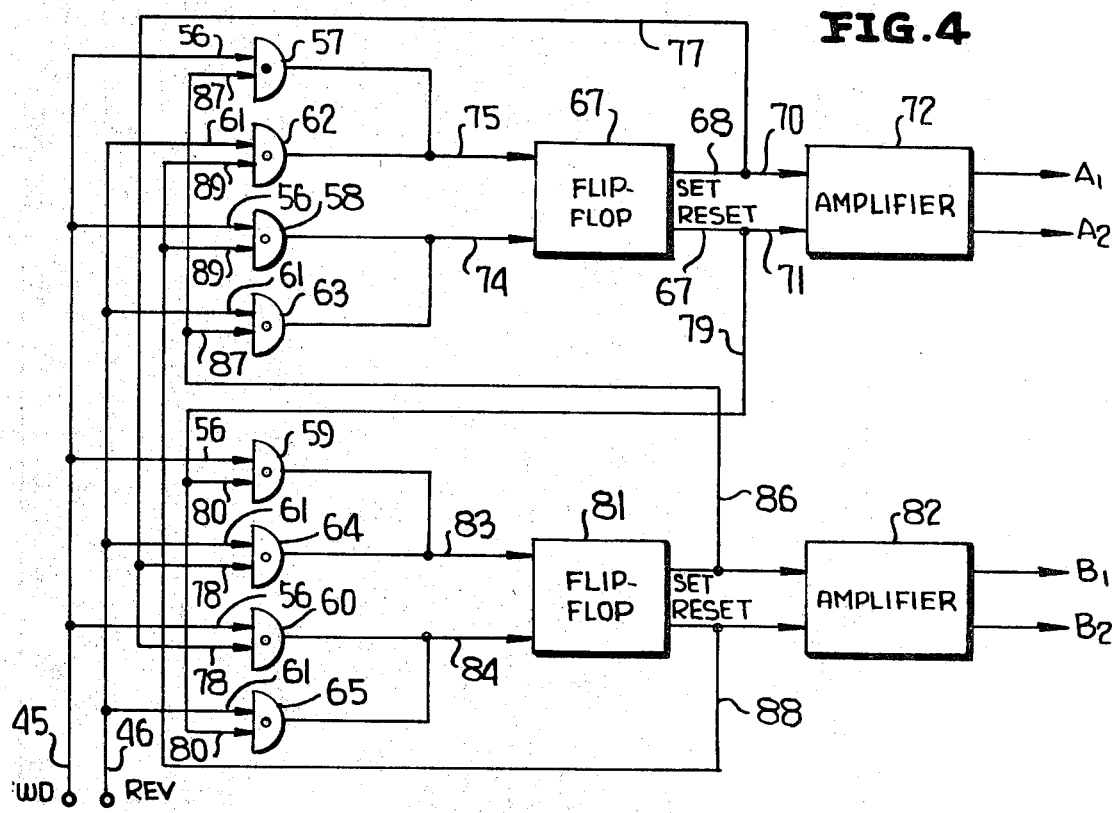
FIG. 4 is a schematic circuit diagram of a fluid logic driver system suitable for digitally driving the motor of FIGS. 2 and 3.

Referring now to FIG. 1, the multiphase step motor includes a rotor or wobble disk 10 having a circular cutout region 11 at its center to accommodate a thin sheet 12 of material which provides a flexible pivotal coupling between the rotor and a shaft 13 while substantially preventing rotational "play" or looseness between rotor and shaft. A suitable material is thin beryllium sheet 12 cut in the shape of a disk with a central opening to accept shaft 13 and to permit fastening, as by rivets 14, to a bushing 15 secured to the shaft, as by a press fit or a set screw, or both. Spring sheet 12 is fastened adjacent its periphery to the underside (as viewed in FIG. 1) of rotor disk 10, by rivets 16 adjacent the rim of hole 11.

The rotor carries a circular gear 17 having teeth projecting from the plane of the disk to mate with the teeth of a confronting fixed circular gear 18 within which shaft 13 is free to rotate. The rotor is attached to the shaft at a point therealong sufficiently displaced from the point at which the plane of gear 18 intersects the shaft to require tilting of disk 10 relative to the shaft if the two gears are to mesh, and even then allowing complete meshing of the gears in only a small sector proximate the point(s) of application of forces tending to cause the tilting of the rotor on the shaft. Such a sector is designated by way of example by reference numeral 20, for forces exerted on the rotor as illustrated by arrows 21 and 22. Thus, if the points of application of the forces are changed in a sequence about the rotor, the rotor will undergo wobbling motion about the axis of the shaft to cause the sector of meshing engagement of the gears to move in a corresponding direction and at a corresponding speed. Furthermore, if the two gears have different numbers of teeth, say one less tooth on gear 17 than on gear 18, then the rotor rotates through an angle conforming to that difference in teeth in a direction opposite that of the wobble, for each full revolution of "wobble-around" of the rotor. If rotor gear 17 has a greater number of teeth than fixed gear 18, the sense of rotation of the rotor is the same as the sense of the wobble. Since the rotor is fastened to the shaft, albeit a flexible coupling that permits tilting of the rotor, as the rotor rotates it drives the shaft through a corresponding angle of rotation.

The angle at which rotor disk 10 may tilt relative to the plane of fixed gear (frame gear) 18 is exaggerated in FIG. 1 for the sake of clarity and illustration. In practice, that angle will generally be rather small, on the order of 1°, since less power must then be expended to produce meshing of the gears and less difficulty is encountered in cutting the gear teeth to enable the desired meshing therebetween.

The motor structure is shown in more detailed form in FIGS. 2 and 3. Frame gear 18 is fastened to the lower wall 25 (as viewed in FIG. 3) of the motor housing. Wall 25 has a central opening 26 to accommodate and retain a lower bearing 27 in which shaft 13 may undergo relatively frictionless rotation. The shaft also rides in an upper bearing 28 seated and retained in an upper wall 30 of the motor housing. Lower and upper end walls 25 and 30, respectively, are separated from one another by a cylindrical or tubular side wall 31 seated in undercut regions adjacent the periphery of either end wall, to define a chamber 32 within which the basic motor elements of FIG. 1 are housed.

In particular, rotor disk 10 is fastened to a larger diameter region 33 of shaft 13 between bearings 27 and 28 by riveted mounting of the flexible portion 12 on bushing 15 which is itself attached to the shaft, as described above with reference to FIG. 1. The rigid portion of rotor 10 is thus oriented generally perpendicular (actually deviating therefrom by the permissible angle of tilt, when tilted relative to the shaft) to a plurality of holes or passageways 35 in upper wall 30 via which actuating fluid pulses are to be supplied for producing the desired wobble motion of the rotor.

End wall 30 and overlying plates or laminae 36, 37 and 38 preferably contain the fluid logic elements and fluid amplifiers and related interconnecting tubes or passageways making up the pure fluid driver system for the step motor. Details of the driver will be described in the subsequent course of discussion of FIGS. 4 and 5. For the present, it is sufficient to observe that fluid inputs are supplied to the driver system via tubes 40, 41, 42 and 43 threadedly connected to nozzles of the pure fluid system within the laminae at the rear portion of the motor housing. Tube 40 supplies fluid pulses to the forward or clockwise (CW) input port 45 (FIG. 4) of the driver, whereas tube 41 delivers fluid pulses to the reverse or counterclockwise (CCW) input port 46 (FIG. 4) of the driver. Obviously, pulses are supplied to only one of these two input ports during any given interval of time, and are preferably obtained from a pneumatic pulse oscillator (not shown) capable of delivering equally spaced pulses of air at sonic velocities at a pressure of from one to three p.s.i. In some instances it may be desirable to gradually increase and decrease the rotor motion at starting and stopping, respectively, of the motor; as when the motor shaft is subjected to heavy loading. In such instances, the pulses from the oscillator may be appropriately programmed so that they occur at a lower repetition rate at the beginning and end of a set of pulses of specified number for incremental rotation of the shaft through a predetermined number of steps, than the constant repetition rate during the midportion of the pulse set. The pulses emanating from the oscillator (or subsequent programmer) via a duct or passage may be selectively switched to tubes 40 and 41 according to whether forward or reverse shaft rotation is desired, by use of a lock-on fluid flip-flop (not shown) of the type to be described presently in conjunction with the discussion of FIG. 5.

Fluid flow is delivered at a constant regulated pressure of about two to three p.s.i. via tube 42 to the power stream input ports of flip-flops in the driver system, and via tube 43 to the power stream input ports of amplifiers in the driver system, from a suitable source (not shown) of fluid under pressure. The motor housing, including the disk shaped plates having grooves defining the fluid elements, and the end walls and tubular side wall, is held together as a complete unit by fasteners (e.g., nuts and bolts) positioned at aligned holes through the several layers at equiangularly spaced axes 47.

Actuating output pulses emanating from the driver system are directed into passages 35 in a direction toward rotor disk 10 in a switching format determined by the driver logic. This format of actuating pulses constitutes a phase energization sequence appropriate to cause unidirectional wobbling (depending on direction designated by input port 40 or 41 to which pulses are initially supplied) of rotor 10, and hence of gear 17 carried thereby, about the axis of shaft 13. The shaft, in turn, is driven in response to rotation of the rotor as the gears 17, 18 mesh in a moving sector about the shaft axis. For example, and with particular reference to FIG. 2, four equiangularly spaced passages 35 are provided in wall 30 to conform to four motor phases designated A1, A2, B1, and B2, where A1 and A2 are diametrically opposite one another and B1 and B2 are also diametrically opposite one another on a line perpendicularly intersecting, at the axis of the shaft, the line joining phases A1 and A2. By delivering fluidic pulses to passages 35 in the format A1 and B1, B1 and A2, A2 and B2, B2 and A1, A1 and B1, and so forth, the rotor will be subjected to impact forces as the air pulses impinge on the rotor surface from passages 35, producing wobble motion of the rotor in the same direction as the pulses arrive in the sequence. Preferably, however, the fluid actuating pulses are not applied directly to the rotor disk but to respective flexible membranes 40 covering passages 35. The membranes may be provided by cementing a thin ring-like sheet 51 of rubber or substantially equivalent material to the surface of end wall 30 adjacent chamber 32 (FIG. 3) except in a substantially circular region 53 about the mount of each passage 35. Thereby, as the fluid pulses are sequentially supplied to the passages 35 the respective membranes 50 are distended outwardly by the fluid pressure, forcing them in turn against the confronting surface of rotor disk 10, as is illustrated for membrane 50 at the left hand side of the motor in FIG. 3. This essentially restricts the applied forces to a limited area on the rotor surface in contrast to the diffusing effect that would occur if the fluid were to flow directly from the mouth of each passage 35 onto the rotor disk.

A schematic diagram of the fluid driver system, using the analogous electrical symbolism, is shown in FIG. 4. The pulse train applied to tube 40 or to tube 41 (FIG. 3) and thence to the forward input port 45 or reverse input port 46, respectively, of the fluid logic, is then delivered in parallel to corresponding input ports or openings 56 of AND fluid logic elements (gates) 57, 58, 59, 60 for forward drive, or to corresponding ports or openings 61 of AND fluid logic elements (gates) 62, 63, 64, 65 for reverse drive, respectively. The remaining input port of each AND gate, both forward and reverse, is coupled to a preselected feedback duct from the output of a bistable fluid element (flip-flop) associated with and following each group of two forward (or two reverse) AND gates, depending on the particular sequential switch format desired for actuating the motor phases. For the switching format designated above, i.e., A1 and B1, B1 and A2, A2 and B2, et cetera, the coupling connections are as shown in FIG. 4.

Figure 5:
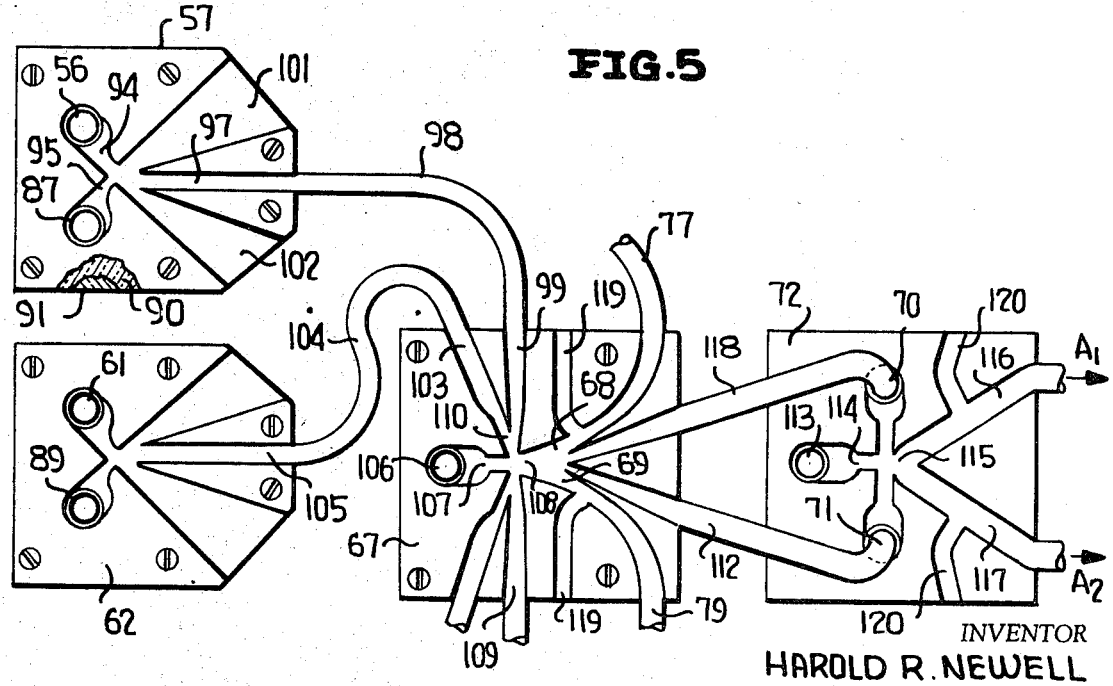
FIG. 5 is a portion of the fluid system of FIG. 4, showing suitable fluidic elements and their interconnection.

In particular, flip-flop 67 supplies a set output from port 68 or a reset output from port 69 as respective control streams to control input port 70 or 71 of amplifier 72 (associated with motor phases A1 and A2), depending respectively on whether a control stream is supplied at input port 74 from either of gates 58 or 63 or at input port 75 from either of gates 57 or 62. The set output of flip-flop 67 is also partly fed back via duct 77 as an input to port 78 of each of gates 60 and 64. The reset output of flip-flop 67 is partly fed back via duct 79 as an input to port 80 of each of gates 59 and 65. A similar arrangement is provided with flip-flop 81 and amplifier 82 associated with motor phases B1 and B2. Flip-flop 81 receives a control stream input at either port 83 or 84 and responds respectively to produce a reset output or set output as a control stream to amplifier 82. In addition, the set output stream is partly fed back via duct 86 to input port 87 of each of AND gates 57 and 63, whereas the reset output stream is partly fed back via duct 88 to input port 89 of each of gates 58 and 62. The power stream input ports for each of flip-flops 67 and 81 and amplifiers 72 and 82 are not shown in the schematic diagram of FIG. 4, but an exemplary portion of the driver system using conventional fluid logic elements, including power stream input ports, is shown in FIG. 5, to which reference is now made for an explanation of basic operation of the fluid logic.

As is well known, each pure fluid element, such as AND gate 57, is formed as a specially grooved or molded configuration, depending on desired function, between a pair of flat plates (e.g., 90, 91 for gate 57) which are sealed together in fluid-tight relationship, except in the grooved regions, by conventional fasteners or adhesive cement. For the sake of illustration the plates are shown as composed of clear plastic, although other materials compatible with the fluid used in the system may obviously be employed as alternatives. AND elements 57 and 62, and multiple input-multiple output bistable element 67 may be of the type disclosed by Warren in U.S. Pat. 3,272,214, for example, while fluid amplifier (also a bistable flip-flop element as depicted here) 72 may be of any conventional type, including that disclosed by Warren et al. in U.S. Pat. 3,225,780. Each of the fluid elements is of the "lock-on" or "wall attachment" type. For purposes of clarity each fluid element is shown as a separate and distinct unit coupled to the other elements by tubes, ducts, passages, or the like. In practice, however, and as observed in the description of FIG. 3, several fluid logic elements may be incorporated between only one or two pairs of disk-like plates for convenient attachment to or as part of the step motor housing, the several elements coupled together to provide the desired pure fluid driver system in a compact form.

Fluid input pulses delivered to "forward" input port 45 (FIG. 4) of the driver via tube 40 (FIG. 3) from the pulse oscillator, are directed into port or opening 56 of AND element 57 (as well as simultaneously to respective ports 56 of the other forward AND elements 58, 59, and 60, as shown in FIG. 4). Assuming simultaneous fluid flow into opening 87 of AND element 57 as a result of feedback from the set output port of flip-flop 81 via duct 86 (FIG. 4), then both input ports of AND element 57 are supplied with fluid signals, which are fed through perpendicularly oriented nozzles 94, 95, respectively, to an interaction chamber 96. Fluid flow representative of the logical product (AND function) of the two input streams thus occurs in output passage 97 during substantially the time interval occupied by a pulse arriving at opening 56. A control pulse is thereby supplied through duct 98 to control stream input passage 99 of flip-flop 67. Output passages 101 and 102 of AND element 57 are vents or bleeders, accepting fluid flow in the event of but a signal input (at opening 87 or 56, respectively) to the AND element.

The other control input passage 103 of flip-flop 67, on the same side as control passage 99 to which the control pulse output of AND element 57 is fed, is coupled via a tube 104 to receive a control pulse from the output passage 105 of AND element 62 when the latter has simultaneous fluid inputs at openings 61 and 89. This situation can occur for AND element 62 only when "reverse" pulses are applied to port 46 (FIG. 4) of the driver, and feedback fluid flow is delivered from the reset output of flip-flop 81. Since only one of the forward and reverse controls is to be exercised at any given time, as was observed earlier, flip-flop 67 has a control stream (pulse, here) applied to only one of its control passages 99 and 103 at any given instant.

A continuous power stream is supplied through tube 42 (FIG. 3) to port or opening 106 of flip-flop 67 (and as well to a corresponding power stream input port of flip-flop 82). Assuming that after passage through power nozzle 107 and interaction chamber 108, this power stream has been locked on to a sidewall of "set" output passage 68 (e.g., as the result of interaction with a previous control pulse applied to control passage 109), then the control pulse presently appearing in passage 99 is effective, upon issuing through control nozzle 110 and into interaction chamber 108, to switch the power stream from output passage 68 to a point of attachment along a sidewall of output passage 69. The power stream will continue to issue into "reset" output passage 69 after termination of the control pulse into control passage 99, and will therefore split to deliver a fluid flow to both feedback duct 79 and to control stream input port 71 of amplifier 72 (through duct 112) until switched back to "set" output passage 68 by a control pulse delivered to port 109.

A continuous regulated power stream entering opening 113 of amplifier 72 (through duct 43, FIG. 3), feeds through power nozzle 114 into interaction chamber 115. Since amplifier 72 is basically a flip-flop device, in which the power stream is locked on to a side wall of one of the two output passages 117 and 116 depending on whether it has last interacted with a control stream from tube 118 through control input port 70 or from tube 112 through input port 71, rspectively, then the control pulse applied to port 71 from flip-flop 67 will either switch the power stream to output passage 116 (and thus supply an actuating pulse to phase A1), or will not affect the position of the power stream if already issuing into output passage 116.

Vents or bleeders are provided in the form of passages 119 and 120 in flip-flop 67 and amplifier 72 to permit exhausting fluid from the distended membranes 50 and associated ducts 35.

Having thus generally described the operation of each type of fluid element in the driver system for the step motor, and their interaction, reference is again made to FIG. 4 for a dscription of overall operation. A pulse train consisting of a preselected number of input pulses, to drive the motor through a predetermined number of steps, is applied to "forward" port 45 for delivery in parallel to AND gates 57, 58, 59, and 60. Assuming for purposes of example, that flip-flop 67 is presently reset, and flip-flop 81 is presently set (a condition which has resulted in actuation of inputs A1 and B2), then two inputs are simultaneously applied to only AND elements 57 and 59. Accordingly, a control pulse is supplied to input port 75 of flip-flop 67 and another control pulse to input port 83 of flip-flop 81. As described with reference to FIG. 5, this results in maintenance of the "reset" output from flip-flop 67, and switching to a "reset" output from flip-flop 81. When the two "reset" fluid streams are supplied as control inputs to amplifiers 72 and 82 they cause the respective power streams to issue as actuating pulses to phases A1 and B1, respectively. Thus, phase A1 has remained in an "energized" state during two pulse intervals, through the first of which B2 was simultaneously energized and through the second of which B1 is simultaneously energized. Sequential energization of the several phases in the format A1 and B1, B1 and A2, A2 and B2, B2 and A1, etc., should now be apparent.

As these actuating pulses impinge on the respective flexible membranes covering respective passages 35 (FIGS. 2 and 3) the membranes are distended in sequence, and sequential forces are thereby applied to rotor disk 10 to deflect the disk in a continuing wobble motion about the axis of shaft 13, from the initiation to the termination of the pulse train applied to the forward (or reverse) port. Consequently, rotor gear 17 meshes with frame gear 18 in successive sectors of the two gears, depending on direction of wobble, and the two gears undergo relative rotation by virtue of the tooth differential therebetween. Since frame gear 18 is fixed, in this embodiment, and rotor gear 17 is attached to shaft 13 via the rotor and flexible coupling member 12, gear 17 rotates in a direction that depends on the sign of the tooth differential (i.e., upon whether it has more or less teeth than gear 18) and drives shaft 13 in rotation.

Referring to FIGS. 6 and 7, a second embodiment of a step motor is shown which may be actuated by a pure fluid logic driver system similar to that described above except for appropriate modification for actuating a greater number of phases. The motor housing includes end walls 150 and 151 and a cylindrical side wall 152, fastened together with bolts 153 to define a chamber 154 into which rotatable shaft 155 extends along an axis common to the axis of symmetry of the housing. Shaft 155 is rotatable in bearings 157 and 158 and 159, seated and retained in appropriate undercut regions of end walls 151 and 152, respectively. A bushing or collar 160 is actually fastened to shaft 155 to be received within bearings 158 and 159, and retaining rings 161 and 162 are used to hold the entire shaft assembly longitudinally in place within the motor.

A circular gear 163 is fastened to collar 160 and thus to the shaft and is coaxial with the shaft. Accordingly rotation of gear 163 results in corresponding rotation of shaft 155, and vice versa. Another gear 165 coaxial with the shaft is mounted on the frame or housing of the motor and is hereinafter referred to as the frame gear. The wobble rotor 168 is pivotally coupled to the shaft on a spherical bearing 169 constituting a universal joint free to move longitudinally on the shaft, within the limits imposed by collar 160 and retaining ring 161, but substantially confined or restrained to a sufficient extent to prevent radial movement of the rotor. The limited longitudinal movement of bearing 169 ensures proper seating of the several gears during intermeshing thereof, despite gear wear over prolonged periods of use.

Rotor 168 carries coaxial gears 170 and 171 arranged to cooperate with shaft gear 163 and frame gear 165, respectively. Preferably, gears 165 and 171 have an equal number of teeth, so that wobbling of the rotor is effected without rotation relative to the motor housing, whereas gears 170 and 163 have a slight tooth differential, say one tooth. Thus, if gear 163 has 359 teeth and gear 170 has 360 teeth, for example, then meshing of the two gears through 360° results in shaft rotation equivalent to but a single tooth (i.e., 1°), and in the same direction as the direction of wobble of rotor 168.

An undercut region 173 in wall 151 and a cooperating raised portion 174 on rotor 168 limit the deflection of the rotor that will produce the desired meshing of the gears in a limited mutual sector to a small angle, say 1°.

In the embodiment of FIGS. 6 and 7, ducts 180 are provided in a circular array of holes oriented substantially perpendicular to the plane of the rotor in end wall. The number of ducts is equal to the desired number of phases of the motor, and each duct serves to pass the actuating fluid pulse that will produce a deflecting force on the rotor, similar to the passages 35 of the earlier-described embodiment. Fluid introduced into the chamber is exhausted via respective outlet passages 182, cooperating members 173 and 174 substantially preventing entry of fluid into the central region of the chamber. Alternatively, the inlet ducts may have their ports covered with respective flexible membranes as in the earlier-described embodiment.

Operation proceeds in the same manner as described above except that all four gears mesh and the rotor undergoes wobbling without rotation relative to the frame. Meshing of gears 163 and 170 produces the rotation of shaft 155, at a very low rotatory rate if both of these gears have a large number of teeth and a very slight tooth differential.

I claim:

1. A pure fluid actuated multiphase step motor comprising
   a shaft having a longitudinal axis,
   first and second circular gears spaced along said shaft and sharing said axis,
   means coupling one of said gears to said shaft for rotation therewith,
   means coupling the other of said gears for rotation relative to said shaft,
   said gears having confronting teeth normally projecting from the respective planes of said gears and normally separated from one another in non-meshing relation,
   means further pivotally coupling one of said gears relative to said shaft to permit the pivotally coupled gear to tilt relative to said axis in response to application of force directed substantially perpendicular to the plane of said pivotally coupled gear and thereby to mesh with the other gear in a mutual sector of the two gears, said gears having a tooth differential, and a plurality of open-ended ducts spaced about said axis and oriented substantially prependicular to the plane of said pivotally coupled gear in fluid-supplying relation thereto, said ducts conforming in number and location to the respective phases of said motor; and fluid logic driver means responsive to a set of fluid pulses of preselected number to selectively deliver fluid pulses to said ducts in a predetermined sequential format for corresponding application of successive deflecting forces to said pivotally coupled gear, producing a wobble motion of said pivotally coupled gear about said axis and consequent meshing of successive sectors of the two gears, said gears thereby undergoing relative rotation by virtue of said tooth differential, and incrementally driving said shaft through an angle depending on the number of pulses in said set and the numbers of teeth on said gears.

2. The combination according to claim 1 wherein is further provided a flexible membrane covering the open end of each duct adjacent said pivotally coupled gear, each said membrane normally separated from said pivotally coupled gear by a distance sufficiently small to permit contact between the membrane and said pivotally coupled gear upon distension of the membrane by a fluid pulse delivered to the respective duct covered by that membrane.

3. The combination according to claim 1 wherein said means coupling one of said gears to said shaft for rotation therewith includes said pivotal coupling means.

4. The combination according to claim 1 wherein said means coupling the other of said gears for rotation relative to said shaft includes said pivotal coupling means.

5. The combination according to claim 4 wherein said means coupling the other of said gears for rotation relative to said shaft comprises a universal joint slidable longitudinally along said shaft, rotatable relative to said shaft, and substantially confined to prevent movement radially thereon, and further includes a disk coupled to said universal joint and lying in the plane of said first gear, said first gear fastened to said disk; a third gear coaxial with said first gear and fastened to said disk, a fourth gear coaxial with said second gear and having teeth confronting the teeth of said third gear for meshing therewith in said mutual sector upon deflection of said disk through a sufficient tilt angle relative to said axis, a frame for said motor, said fourth gear fastened to said frame.

6. The combination according to claim 5 wherein both of said third and fourth gears have the same number of teeth to prevent relative rotation therebetween upon continued meshing thereof in response to wobbling of said disk about asid axis, whereby said wobbling of said disk occurs without rotation relative to said motor frame.

7. The combination according to claim 1 wherein said fluid logic driver means includes a plurality of AND elements equal in number to the number of phases of said motor; and a plurality of flip-flop elements each associated with a distinct and different pair of opposite phases of said motor; each of said AND elements having a pair of input ports and an output port; each of said flip-flop elements having an interaction chamber, a power nozzle for issuing a power stream into said chamber, a pair of control nozzles for issuing a control stream into either side of said chamber for interaction with said power stream to effect directional displacement thereof, first and second output passages for receiving fluid flow from said chamber depending upon said directional displacement of said power stream, a respective feedback duct for each of said output passages for receiving at least a portion of the fluid flow in the respective output passage; means for applying said set of pulses to a corresponding input port of each AND element, in parallel; means coupling the output port of each AND element to a distinct and different control nozzle of a respective flip-flop element; means coupling the output passages of said flip-flop elements to respective ones of said plurality of ducts in fluid-supplying relation with said pivotally coupled gear; and means coupling the feedback ducts of said flip-flop elements to respective ones of the other input port of said AND elements to produce said predetermined sequential format.

8. The combination according to claim 7 further including a respective resilient membrane covering the open end of each said duct of the plurality of ducts in fluid-supplying relation with said pivotally coupled gear, each said resilient membrane normally separated from said pivotally coupled gear by a sufficiently small distance to permit force-supplying contact therewith upon distension of that membrane by a fluid pulse applied to the respectively associated duct.

9. A pure fluid step motor responsive to a train of fluid pulses of predetermined number to undergo stepping through a number of increments functionally related to said predetermined number of pulses, comprising a rotor disk, a shaft, means pivotally coupling said rotor disk to said shaft to permit wobble motion of said rotor disk about the axis of said shaft, gear means responsive to wobble motion of said rotor disk about said axis to drive said shaft through an angle of rotation related to the extent of the wobble motion, and means responsive to said train of fluid pulses for directing a circular sequence of actuating fluid pulses in a predetermined format substantially perpendicularly to the plane of said rotor disk, to produce circularly moving deflecting forces on said rotor disk effecting said wobble motion for a period of time depending on the number and spacing of pulses in said train.

10. A step motor, comprising a shaft having an axis, a disk carrying a circular gear and coupled to said shaft to wobble about said axis, a further circular gear arranged relative to the first-named gear to mesh therewith upon wobbling of said disk about said axis, means connecting one of said disk and said further gear to said shaft to drive said shaft in rotation upon wobbling of said disk about said axis, and pure fluid actuating means for applying fluid impulses to said disk to produce wobbling movement of said disk about said axis.

11. The step motor according to claim 10 wherein said actuating means includes a plurality of ducts disposed in a circular array about said axis for projecting fluid impulses toward said disk in a direction substantially parallel to said axis.

12. The step motor according to claim 11 wherein is further provided a plurality of resilient diaphragms each covering an outlet of a respective one of said ducts to impart a force on said disk in response to a fluid impulse carried by the associated duct.

13. The step motor according to claim 10 wherein said actuating means includes a plurality of passages distributed about said axis and oriented relative to said disk for directing said fluid impulses thereon, and means for supplying fluid impulses to said passages in a predetermined sequential format.

14. A step motor, comprising a wobble motor in which a shaft is driven in rotation in response to wobbling of gear means about the axis of said shaft, and pure fluid actuating means including a plurality of fluid-conducting passages oriented relative to said gear means to direct a composite pattern of fluid thereat, and programming means for delivering fluid to said passages in a format of sequential interruption to produce said wobbling of said gear means about said axis.

References Cited

UNITED STATES PATENTS

| | | | |
|---|---|---|---|
| 3,294,994 | 12/1966 | Anderson | 74—800X |
| 3,428,839 | 2/1969 | Singleton et al. | 74—800X |
| 3,500,852 | 3/1970 | Bauer | 137—81.5 |
| 3,504,691 | 4/1970 | Campagnuolo et al. | 137—81.5 |

LEONARD H. GERIN, Primary Examiner

U.S. Cl. X.R.

91—3; 137—81.5